United States Patent
Bauman et al.

(10) Patent No.: US 7,853,304 B2
(45) Date of Patent: Dec. 14, 2010

(54) METHOD AND DEVICE FOR RECONSTRUCTING TWO-DIMENSIONAL SECTIONAL IMAGES

(75) Inventors: Rolf Bauman, Munich (DE); Marcus Schreckenberg, Freising (DE); Georg Schummers, Munich (DE)

(73) Assignee: Tomtec Imaging Systems GmbH (DE)

( * ) Notice: Subject to any disclaimer, the term of this patent is extended or adjusted under 35 U.S.C. 154(b) by 632 days.

(21) Appl. No.: 11/129,529

(22) Filed: May 13, 2005

(65) Prior Publication Data
US 2006/0291705 A1 Dec. 28, 2006

(51) Int. Cl.
*A61B 5/05* (2006.01)
*A61B 8/00* (2006.01)
*G06K 9/36* (2006.01)

(52) U.S. Cl. .................. 600/407; 600/425; 600/437; 382/276

(58) Field of Classification Search ............. 600/437, 600/407, 450; 382/276, 128
See application file for complete search history.

(56) References Cited

U.S. PATENT DOCUMENTS

| | | | |
|---|---|---|---|
| 4,920,573 A | 4/1990 | Rhodes et al. | |
| 5,458,111 A | 10/1995 | Coin et al. | |
| 5,699,799 A * | 12/1997 | Xu et al. | 600/407 |
| 6,718,193 B2 * | 4/2004 | Knoplioch et al. | 600/407 |
| 6,975,897 B2 * | 12/2005 | Knoplioch et al. | 600/425 |
| 2002/0072672 A1 * | 6/2002 | Roundhill et al. | 600/450 |
| 2002/0106116 A1 | 8/2002 | Knoplioch et al. | |
| 2005/0113664 A1 * | 5/2005 | Stefani et al. | 600/407 |

FOREIGN PATENT DOCUMENTS

| | | |
|---|---|---|
| JP | 2000-242766 A | 9/2000 |
| JP | 06-215153 A | 8/2006 |
| WO | WO 01/37219 | 5/2001 |
| WO | WO 2004/021284 | 3/2004 |
| WO | WO 2005/011501 A1 | 2/2005 |

* cited by examiner

*Primary Examiner*—Eric F Winakur
*Assistant Examiner*—Katherine L Fernandez
(74) *Attorney, Agent, or Firm*—Cantor Colburn LLP

(57) ABSTRACT

The invention relates to a method and device for reconstructing two-dimensional sectional images from a three- or four-dimensional image data set of an object, for example the left ventricle. The method comprises the steps of calculating an anatomical long axis through the object, such that the length and/or shape of the anatomical long axis is adapted to the length and/or shape of the object, and defining a series of sectional planes perpendicular or parallel to the anatomical long axis, and calculating and displaying sectional images corresponding to the sectional planes.

21 Claims, 5 Drawing Sheets

METHOD AND DEVICE FOR RECONSTRUCTING TWO-DIMENSIONAL SECTIONAL IMAGES

FIELD OF THE INVENTION

The present invention relates to a method and device for reconstructing two-dimensional sectional images from a three- or four-dimensional image data set acquired by medical imaging. In particular, the invention is directed to reconstructing such two-dimensional sectional images from a chamber of the heart such as the left ventricle.

BACKGROUND

Medical imaging methods such as ultrasound, MRI, CT or PET often provide the possibility of acquiring three-dimensional image data sets of certain areas of the body. In the case of moving organs, such as the heart, the major arterial blood vessels or any other organs subjected to cardiac or respiratory movement, many medical imaging methods allow the acquisition of dynamic four-dimensional image data sets, which contain three-dimensional image information of the object at different time points (e.g. moving heart).

However, when viewing and assessing the acquired volume data, most medical practitioners resort to two-dimensional images again, because they are used to forming a diagnosis on the basis of certain two-dimensional views. For example, in case of the heart, examination is carried out using specifically aligned cuts through the heart chambers, for example the four-chamber view, the two-chamber view, long axis views and short axis views. The long axis extends from the apex to the base of the heart, while short axis views are perpendicular to the long axis views.

A state of the art method for assessing anomalies in the left ventricle is to reconstruct a series of short axis views through the left ventricle from four-dimensional dynamic image data sets acquired by ultrasound. In other applications, for example MRI, the short axis views may be directly acquired from the heart. In both cases, assessment of the viability of the ventricle wall is considerably complicated by the movement of the heart. Since the short-axis sectional planes stay fixed in space while the heart moves through them, the part of the ventricle wall which is visible in a certain short axis view is not constant over time. Thus, an apparent bulge or swelling in the ventricle wall may be caused simply by the movement of a different part of the heart into the field of view.

Further, the long axis is a straight line, with the short axis views being perpendicular thereto. However, a straight line does not conform well to the shape of the heart chambers, in particular the left ventricle, since these are often not straight ellipses, but "banana"-shaped towards the apex. Thus, the conventionally generated short axis views often have an unfavorable angle to the myocardial wall. This situation is exacerbated by the fact that the ventricles often perform complicated translational and rotational movements during contraction. Thus, movements of the heart chamber may wrongly be interpreted as pathological alterations in the heart.

SUMMARY

It is an object of the invention to provide a method for generating two-dimensional sectional images from a three- or four-dimensional medical image data set which allows a representation of the object which takes account of the specific anatomy of the imaged object, and in the case of dynamic images, allows to represent the same region of the object in a series of sectional images taken at different time points.

To solve these objects, the invention provides a method for reconstructing sectional images from a three- or four-dimensional image data set of an object having an interior space surrounded by walls, in particular of a chamber of the heart, comprising the following steps:

(a) defining an anatomical long axis through the object such that the length and/or shape of the anatomical long axis is adapted to the length and/or shape of the object;
(b) defining a series of intersection points distributed along the anatomical long axis;
(c) defining a series of sectional planes, each plane intersecting an intersection point on the anatomical long axis, wherein the anatomical long axis is not contained in said sectional planes; and
(d) calculating sectional images corresponding to the sectional planes from the image data set.

The invention is also directed to a device comprising a calculation means adapted to perform the above method steps. Further embodiments are disclosed in the following description.

Thus, in contrast to the prior art methods, the long axis through the object or ventricle is not necessarily a straight line, but is adapted to the length and shape of the imaged object. In the case of the heart ventricle, this means that the long axis may be curved to follow the ventricle shape at the apex. The thus adapted long axis is hereafter referred to as "anatomical long axis". In case of a dynamic data set, the anatomical long axis might have a different shape and length at each time point. Especially the length, but possibly the curvature, of the anatomical long axis will vary over the heart cycle.

The sectional planes, representing for example short axis views, are then defined with respect to the anatomical long axis. Thus, the sectional planes are also adapted to the anatomy of the imaged object and, in the case of a dynamic image data set, their position is not fixed in space.

In the context of this application, the term "anatomical long axis" need not necessarily refer to a long axis of the object, but may also refer to a short axis of the object, depending on its particular shape and symmetry.

The intersection points determining the positions of the sectional planes may either be predetermined, or may be chosen by the user. In the last case, the user may be presented with a long axis view of the object on which the position of the anatomical long axis and the intersection points spaced along the axis can be visualized. The user will then be given the opportunity to displace the intersection points along the anatomical long axis, for example to shift the sectional planes towards a pathological area which he wants to examine more closely. Preferably, each sectional plane will intersect the axis approximately at a right angle, although other angles are also possible depending on the configuration of the imaged object. If the sectional planes are not planar, as described below, they may be oriented such that the tangents of the anatomical long axis and the sectional planes at the intersection point form a right angle with each other.

According to a further embodiment, the sectional planes are not necessarily planar planes, but may be bent or curved such that they intersect the walls of the object at a right angle. This has the advantage that the thickness of the wall, e.g. the myocardium wall, is not distorted by oblique cutting through the wall. Thus, the sectional images which are finally viewed by the user do not necessarily correspond to planar planes through the object.

In the case of dynamic data sets consisting of several three-dimensional image data sets corresponding to different time frames, e.g. different time points of the heart cycle, the anatomical long axis is preferably defined anew for each time frame, so the length and/or shape of the long axis may be variable over time. Thereby, one may achieve that the positions of the sectional images are variable over time and shift with the movement of the object. According to a preferred embodiment, this is done by keeping the relative distribution of the intersection points along the anatomical long axis constant over different time frames. In other words, the absolute distances between the intersection points vary over time in proportion with the length of the anatomical long axis. If the sectional planes are perpendicular to the anatomical long axis, their orientation within the data set will also vary with the curvature of the axis over time.

According to a second aspect of the invention, there is provided another method for reconstructing two-dimensional images from a three-dimensional image data set of an object, comprising the following steps:
(a) defining an anatomical long axis through the object such that the length and/or shape of the anatomical long axis is adapted to the length and/or shape of the object;
(b) defining a longitudinal curved plane parallel to the anatomical long axis;
(c) calculating a longitudinal image corresponding to the longitudinal curved plane.

The invention is also directed to a device comprising calculation means for calculating longitudinal images according to the above-described method, and a display means for displaying the longitudinal images, preferably projected onto a planar screen or display surface.

Thus, from the anatomical long axis defined as described above, it is also possible to reconstruct a longitudinal image which, in the case of the heart, corresponds to a long axis view. However, since the anatomical long axis according to the invention may be curved, bent or otherwise adapted to the shape of the object, the longitudinal image may not correspond to a planar plane, but to a curved plane which is curved in at least one direction. When such longitudinal image is viewed on a display screen, it will be "flattened out" or displayed in a way that the 3D appearance will be calculated by a 3D representation method (e.g. 3D Rendering).

A useful application of the above described methods will be to represent both longitudinal images (corresponding to long axis views) and sectional images (corresponding to short axis views) on a display screen. Such representation may be used for the evaluation of a stress-echo-examination, whereby the representation will allow the comparison of images taken at different time frames within the heart cycle, or in different stress situations (e.g. rest phase or peak phase). Most preferred, the short axis views corresponding to the same intersection point along the anatomical long axis at different time points (which do not necessarily correspond to the same point in space) will be shown one below the other, allowing the user to follow the contraction of a certain region of the ventricle wall. Alternatively, these images may be displayed in cine-mode.

The length and shape of the anatomical long axis may be determined for each three-dimensional image data set of the object by any suitable means, preferably fully automatic. According to one embodiment, the anatomical long axis is defined by first determining its two end points, followed by automatic calculation of the path of the anatomical long axis between the end points. The end points of a long axis through the left ventricle might be the apex and the mid point of the mitral valve. These end points may either be determined automatically, or may be defined by the user. The path of the anatomical long axis between the end points may then be calculated by any suitable means which allows to capture the shape of the object, for example by taking account of the center of mass of the interior space within the object.

The three- or four-dimensional image data set may be acquired by any medical imaging method, for example ultrasound, MRI, CT, PET or by infra-red imaging. Most preferred, an ultrasound data set is used, because ultrasound provides the temporal resolution necessary for dynamic assessment of the heart. In this case, a three-dimensional data set is often not Cartesian, but may use circular cylindrical or spherical polar coordinates, corresponding to the ultrasound beams emitted from an ultrasound probe.

The invention also provides a computer program product containing program code which, when running on a computer, may cause the computer to perform the above-described method.

Preferred embodiments of the invention will now be described in connection with the accompanying drawings. The features of the present invention which are believed to be novel are set for the with particularity in the appended claim. The invention, together with further objects and advantages thereof, may best be understood by reference to the following description in conjunction with the accompanying drawings. The drawings show images of the left ventricle, however, the invention may equally be applied to any other object within the human or animal body which may suitably be defined by an axis, such as a blood vessel, part of the intestine, the right ventricle, the left or right atrium, and other organs.

DETAILED DESCRIPTION

In this written description, the use of the disjunctive is intended to include the conjunctive. The use of the definite or indefinite articles is not intended to indicate cardinality. In particular, a reference to "the" object or thing or "an" object or "a" thing is intended to also describe a plurality of such objects or things.

Figure 6:
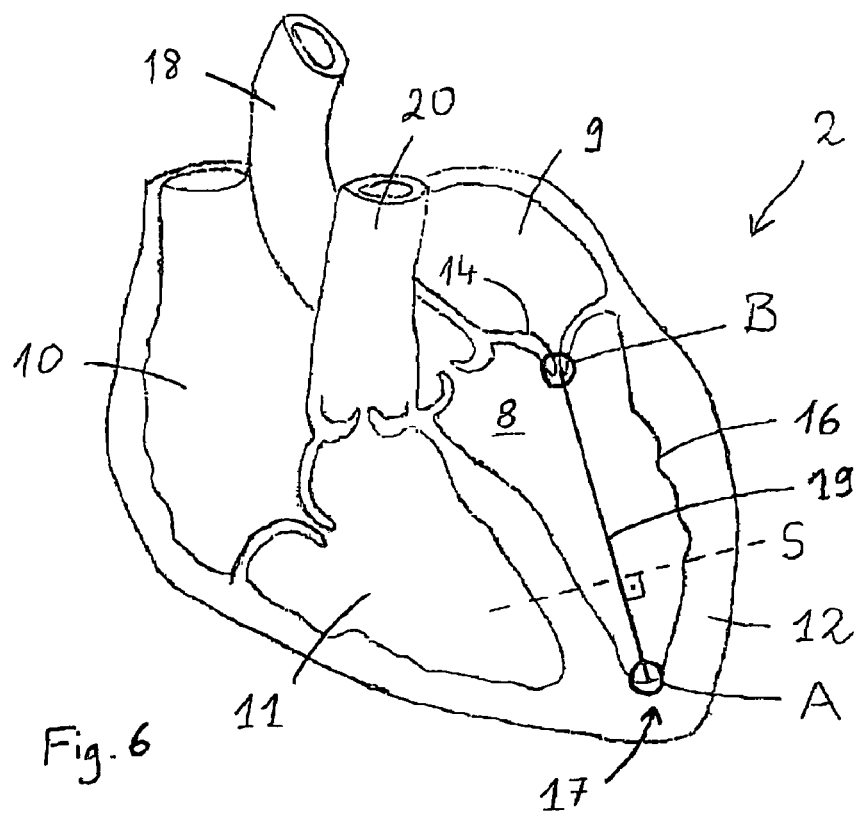
FIG. 6 is a schematic four-chamber view of a heart showing the conventional, straight long axis.

Reference is first made to FIG. 6 which shows a cut through the heart in the so called four-chamber view which intersects all four chambers of the heart, i.e. the left ventricle 8, the left atrium 9, the right atrium 10 and the right ventricle 11. The aorta 18 and the pulmonary artery 20 are also visible. As is apparent from the drawing, the blood flows from the left atrium through the mitral valve 14 into the left ventricle, and is pumped from there through the aortic valve into the aorta

18. The left ventricle 8 is surrounded by walls 12, which include an inner layer 16, the endocardium.

A conventional long axis 19 is also depicted in FIG. 6. Its end points A, B are the apex 17 on the one hand and the mid point of the mitral valve 14 on the other hand. In the state of the art, a straight, rigid line was drawn between these two points, and sectional images were taken perpendicular to this line. However, as is apparent from FIG. 6, the left ventricle has a shape rather different from an ellipsoid and in the area of the apex ends in a "banana-shaped" tapering end. Thus, a straight line is not the most suitable geometrical form of the long axis.

Figure 7:
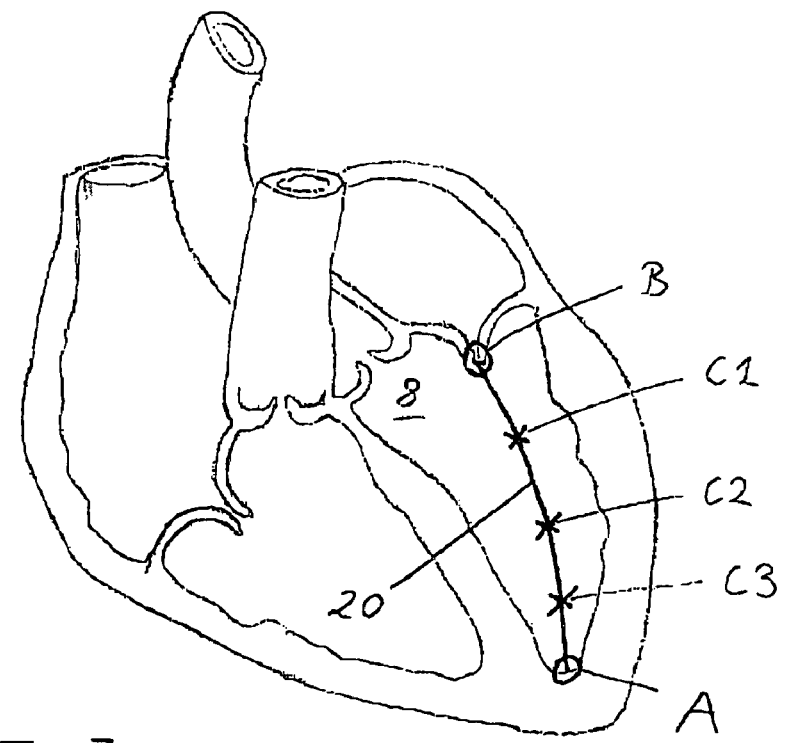
FIG. 7 is a schematic four-chamber view of a heart showing an anatomical long axis.

Thus, in an example of the invention, the long axis will be adapted to the shape of the left ventricle in order to form an "anatomical long axis". This does not exclude a straight line, but includes other shapes. As shown in FIG. 7, the anatomical long axis 20 still extends between points A and B, however, in between have been defined three additional points C1, C2, C3 which follow the curvature of the left ventricle. These points may either be defined by the user, or may be calculated automatically, as described below. Between these points, the anatomical long axis may then be calculated by interpolation.

According to a preferred method of calculating the anatomical long axis, there is defined a straight line 19 between the two end points A, B (see FIG. 6). Then, at a predetermined position along the straight line, there is defined a plane S perpendicular to the straight line 19. This plane S will intersect the ventricular walls. From a sectional image corresponding to this plane S, the endocardium, i.e. the inner skin of the ventricle wall, may be recognized automatically by contour detection methods as known in the prior art. From this cross-section of the ventricular space, the center of mass may be calculated and set to be a new intersection point C3 of the anatomical long axis through this particular plane. This step may be repeated at different positions along the long axis, until a sufficient number of points C1, C2, C3 . . . have been calculated in order to interpolate an anatomical long axis through these points.

Figure 1:
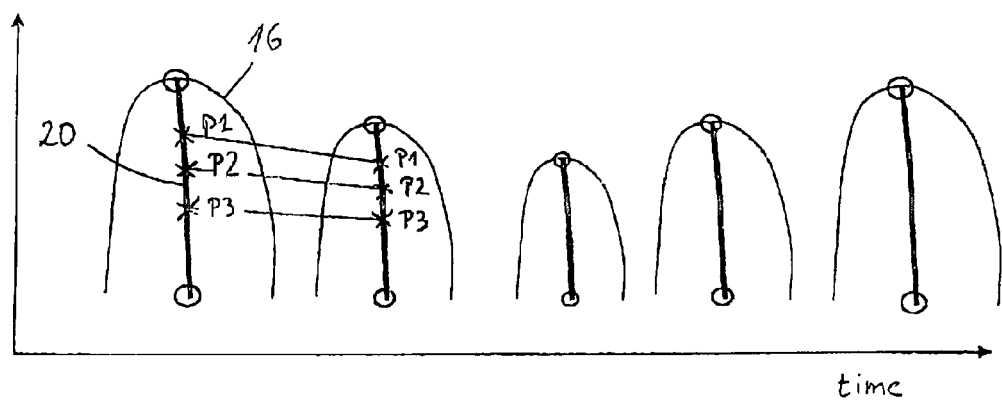
FIG. 1 is a schematic diagram showing the length of the anatomical long axis versus time.

FIG. 1 demonstrates a further aspect of the anatomical long axis, which is its variance over time. FIG. 1 depicts several schematic two-chamber views of the left ventricle at different times during the heart cycle. As is apparent from the figure, the length and/or shape of the long axis 20 varies considerably over time.

As shown in FIG. 1, the anatomical long axis may be variable over time but straight (rather than curved), or it may be adapted to the shape of the ventricle but not variable over time (for example for a static three-dimensional data set), or it may be both variable in time and curved in space.

Figure 2:
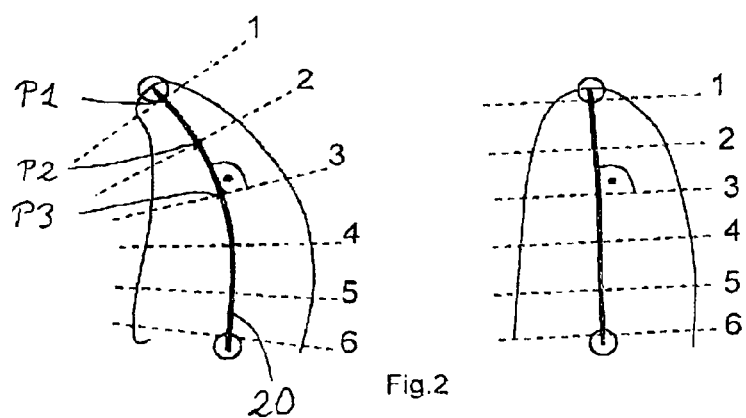
FIG. 2 shows schematic long axis and two-chamber views of a ventricle and the position of the anatomical long axis and intersection points therein.

FIG. 2 demonstrates how the sectional images may be obtained from the anatomical long axis 20. The anatomical long axis 20 is shown on a conventional long axis view, which might be displayed on the display unit of an ultrasound apparatus. To reconstruct the short axis views, first a number of intersection points P1, P2, P3, . . . are defined on the anatomical long axis. In the example, the intersection points are spaced equidistant along the long axis. However, the intersection points may be distributed in any other way, for example closer near the apex than at the base, or vice versa. Alternatively, the user may be allowed to shift the intersection points along the anatomical long axis towards a certain region of interest.

When the intersection points have been defined, sectional planes 1, 2, 3, 4, 5, 6 perpendicular to the anatomical long axis are placed through the intersection points P1, P2, P3, . . . .

According to one alternative, short axis views are calculated which correspond to the sectional planes 1 to 6. The views are reconstructed from the three- or four-dimensional image data set using well-known interpolation methods. This may be done by defining a grid having a predetermined number of points in the plane of each sectional plane, and calculating an image grey value for each point from the nearest pixels in the three- or four-dimensional image data set. This may involve the use of filters in space e.g. 2×2×2 voxels or 4×4×4 voxels contributing to each point on the sectional image. The thus reconstructed short axis views may then be displayed on a monitor or printed out to be viewed by a doctor.

Figure 3:
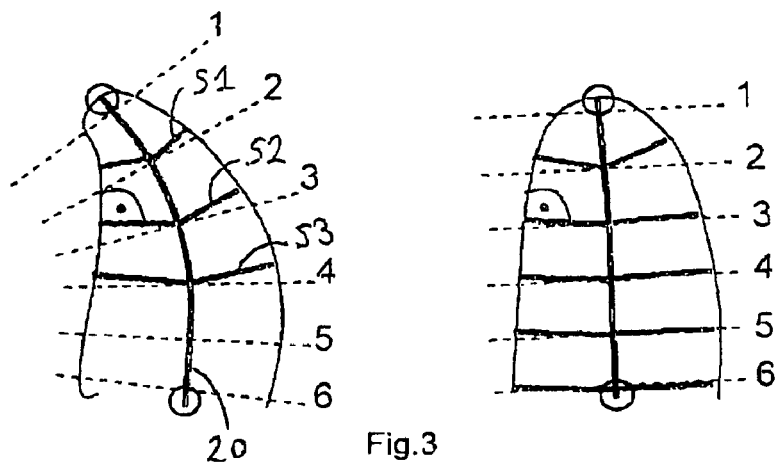
FIG. 3 shows a similar view as in FIG. 2, but with the shape of the sectional planes also shown.

According to the other alternative, the short axis views are not taken along the sectional planar planes 1 to 6, but from planes which intersect the anatomical long axis at the same intersection points P1, P2, P3, . . . but which are bent in order to intersect the ventricular walls at a right angle, as shown in FIG. 3. FIG. 3 shows the position of these bent sectional planes S1, S2, S3 as bold lines in both long axis and two-chamber views. Preferably, the bent shape of the sectional planes S1, S2, S3 is calculated by first detecting the position of the ventricular walls within each three-dimensional data set by known thresholding or surface acquisition methods. With the knowledge of the shape of the ventricular wall, it is possible to automatically curve up the sectional planes in order to meet the wall perpendicularly. As shown in the drawings, the sectional planes S1, S2, S3 may have a conical shape or alternatively a spherical or ellipsoid shape.

Once the curvature of the sectional planes has been determined, the sectional images or short axis images corresponding to these planes are calculated by interpolation from the respective three- or four-dimensional data sets, as described above. To follow the structures over time e.g. a voxel tracking method will be applied to calculate the anatomical long axis and the corresponding short axis over time.

Figure 4:
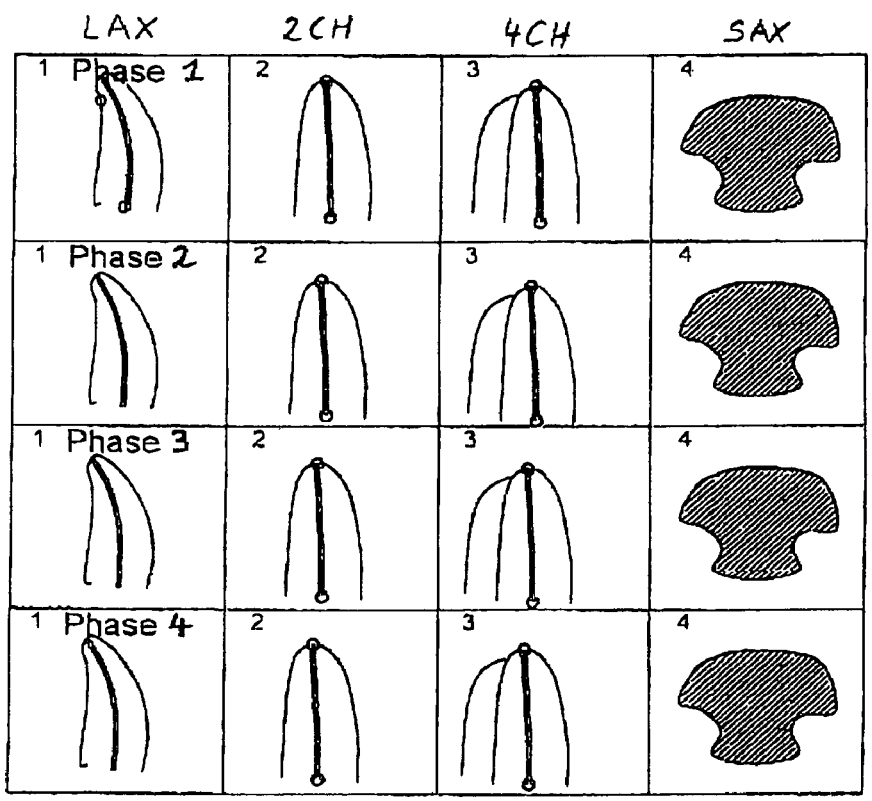
FIG. 4 is a schematic diagram of an exemplary display of long axis views; two-chamber views, four-chamber views and short axis views obtained according to an embodiment of the method of the invention.

A possible display method of the short axis views determined by the above method, and other views, is shown in FIG. 4. The four columns show long axis views, two-chamber views, four-chamber views and the short axis views, respectively. In the horizontal lines, these views are shown at different time frames within the cardiac cycle or in different stress echo phases like rest or peak phase. The viewer will thus be able to follow and compare the movement of the cardiac muscle through the heart cycle, or the different stress phases.

Figure 5:
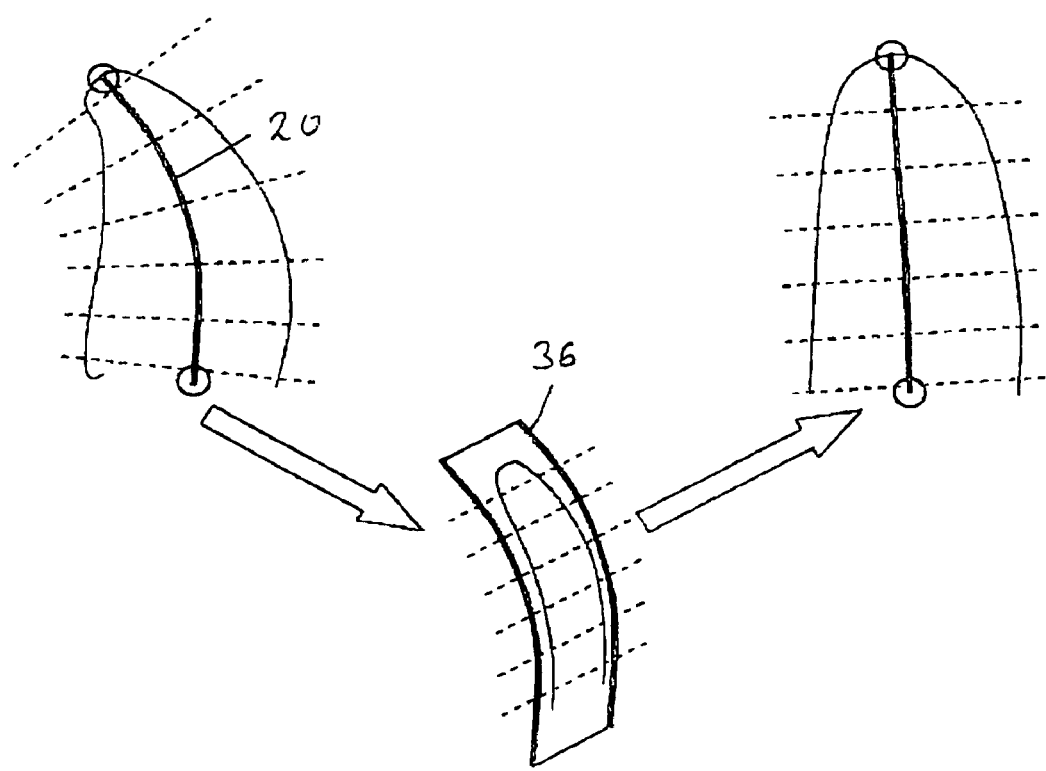
FIG. 5 shows a long axis view according to FIGS. 2 and 3, a respective view of the longitudinal image obtained from the anatomical axis, and the "flattened out" longitudinal image.

An embodiment of the second aspect of the invention, which may be performed alternatively or in addition to the first aspect, is depicted in FIG. 5. The first drawing of FIG. 5 shows a long axis view with an anatomical long axis 20 obtained as described above. However, instead of any planes perpendicular to the anatomical long axis 20, there is now defined a plane parallel to the anatomical long axis. This plane will be curved in the same way as the anatomical long axis, as shown in the perspective view of the second drawing. This longitudinal plane 36 is adapted in shape to the shape of the left ventricle, and may also be taken as the basis for reconstructing an image by interpolation from the three- or four-dimensional data set. When such image is displayed on a monitor, it will be "flattened out", as shown in the last drawing of FIG. 5.

Figure 8:
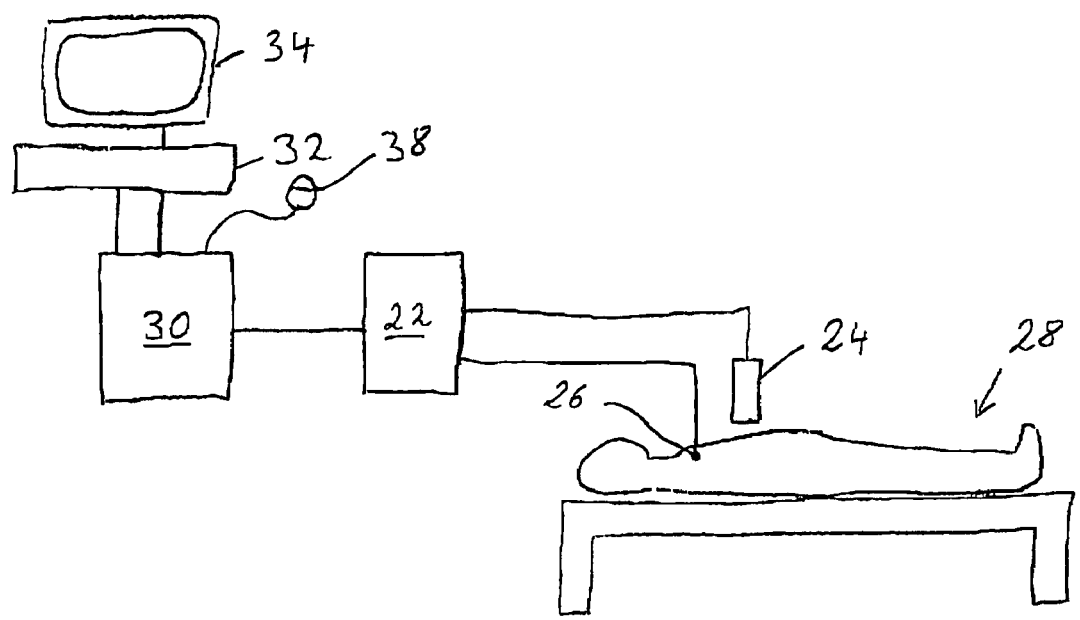
FIG. 8 is a schematic representation of an ultrasound device and an image reconstruction device.

The above described reconstruction methods may be carried out by any computer such as a PC, workstation or medical imaging unit. According to a preferred embodiment, such processing device is connected to or incorporated in an ultrasound unit 22, as shown in FIG. 8. FIG. 8 is a schematic representation of an ultrasound unit and processing device adapted to carry out the above method. Ultrasonic image data are acquired from a patient 28 using the ultrasound head 24. The ultrasound data are transmitted to the ultrasound unit 22 which reconstructs three- or four-dimensional image data sets from the ultrasound data. When acquiring dynamic images, an ECG-device 26 may be used to take an electrocardiogram during the ultrasound acquisition, which will be used to reference the image data to specific time frames within the cardiac cycle. The acquired three- or four-dimensional data sets may then be processed by the reconstruction device 30, such as a computer. The device 30 includes data storage and processing means, and is connected to a display device 34, e.g. a monitor, and optionally to a keyboard 32 and mouse and/or trackball 38.

Preferably, the display device 34 will first be used to display a conventional long axis view of the imaged object, on which the position of the automatically calculated anatomical long axis 20 may be shown and, optionally, changed by the user. Once the user has approved the length, shape and position of the anatomical long axis 20, the reconstruction device 30 will calculate the position of the intersection points P1, P2, P3, which may also be displayed on the monitor 34. Optionally, the user may use the mouse and/or trackball 38 to change the position of the intersection points as described above. In the next step, the reconstruction device 30 will define a series of sectional planes corresponding to the intersection points. Optionally, the position and alignment of these sectional planes may also be displayed on the monitor 34 in a way similar to FIG. 3, to be approved by the user. Finally, the reconstruction device 30 will calculate the anatomical short axis images corresponding to the sectional planes and display such images on the monitor 34.

The reconstruction device 30 may be integrated into the ultra-sound unit 22.

Changes and/or modifications may be made in the method and device according to the invention, without departing from the scope of the invention itself.

Specific embodiments of a method and device for reconstructing two-dimensional sectional images according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. A method for reconstructing two-dimensional sectional images from a four-dimensional dynamic image data set of an object having an interior space surrounded by walls, the four-dimensional image data set being acquired by a medical imaging method and containing several three-dimensional data sets each representing a certain, different time frame within an object cycle, the method comprising:
   (a) defining a respective anatomical long axis within the image data set through the object such that a length and shape of the respective anatomical long axis is adapted to a length and shape of the object;
   (b) defining a series of intersection points within the data set distributed along the anatomical long axis;
   (c) defining a series of sectional planes within the data set, wherein each sectional plane intersects an intersection point on the respective anatomical long axis, wherein the respective anatomical long axis is not contained in said sectional planes with the exception of the intersection point, and wherein the sectional plane and a tangent of the anatomical long axis at the intersection point form approximately a right angle with each other; and
   (d) calculating sectional images corresponding to the sectional planes from the four-dimensional image data set via a reconstruction device, wherein steps a) to d) are automatically repeated for each different three-dimensional data set within a single object cycle, thereby defining a respective anatomical long axis for each time frame, a length and/or shape of each respective anatomical long axis being variable over time wherein a relative distribution of the series of intersection points along each respective anatomical long axis is kept constant automatically, over the different time frames, such that absolute distances between the series of intersection points vary over time in proportion with the length of each anatomical long axis.

2. The method according to claim 1, wherein the intersection points are either spaced equidistantly along each anatomical long axis, or a position of each intersection point of a respective anatomical long axis in a single time frame are defined by a user and each successive anatomical long axis along with associated intersection points are automatically defined such that each respective anatomical long axis varies from each other respective anatomical long axis over time.

3. The method according to claim 1, wherein the sectional planes are bent so as to intersect the walls of the object at a right angle.

4. The method according to claim 1, for reconstructing two-dimensional images from a four-dimensional dynamic image data set of an object having an interior space surrounded by walls the image data set being acquired by a medical imaging method and containing several three-dimensional data sets each representing a certain time frame, the method further comprising the following steps:
   (a) defining an anatomical long axis through the object such that the length and/or shape of the anatomical long axis is adapted to the length and/or shape of at least one chamber of the object;
   (b) defining a longitudinal plane parallel to the anatomical long axis; and
   (c) calculating a longitudinal image corresponding to the longitudinal plane wherein steps a) to c) are automatically repeated for each three-dimensional data set, thereby defining a respective anatomical long axis for each time frame, the length and/or shape of each respective anatomical long axis being variable over time.

5. The method of claim 4, further comprising the step of displaying the sectional images and/or the longitudinal image on a display screen.

6. The method of claim 4, further comprising the step of displaying the sectional images and/or the longitudinal image on a display screen.

7. The method of to claim 4, wherein the anatomical long axis is defined by manual or automatic definition of its two end points, followed by automatic calculation of the path of the anatomical long axis there between.

8. The method of claim 4, wherein each longitudinal plane corresponds to a curved plane which is curved in at least one direction.

9. The method of to claim 1, wherein the respective anatomical long axis is defined by manual or automatic definition of its two end points, followed by automatic calculation of the path of the respective anatomical long axis there between.

10. The method of claim 9, wherein the path of the respective anatomical long axis is automatically calculated by
   (i) defining a straight line between the two end points;
   (ii) defining a plane perpendicular to and at a predetermined position along the straight line in between the two end points;
   (iii) calculating the center of area of the interior space of the object intersected by the plane;
   (iv) defining a new path of the respective anatomical long axis through the center of area calculated in step (iii); and
   (v) automatically iterating steps (ii) to (iv).

11. The method according to claim 1, wherein the four-dimensional image data set is acquired by ultrasound.

12. A computer program product stored on a computer readable medium and containing program code causing a computer to perform the method according to claim 1 when the product is running on a computer.

13. The method of claim 1, wherein the anatomical long axis through the object is defined such that the shape of the anatomical long axis is adapted to the shape of the object, and wherein steps (a) to (d) are automatically repeated for each different three-dimensional data set, thereby defining a respective anatomical long axis for each time frame, the shape of each anatomical long axis being variable over time.

14. The method of claim 1, wherein the anatomical long axis is automatically defined for each different three-dimensional data set.

15. The method of claim 1, wherein based upon the shape of the object, each anatomical long axis is a short axis of the object.

16. The method of claim 1, wherein a position of the sectional images is variable over time and shifts with a movement of the object.

17. The method of claim 1, wherein each anatomical long axis corresponds to a curved plane which is curved in at least one direction.

18. The method of claim 1, wherein when the sectional images are non-planar, the sectional images are oriented such that tangents of each anatomical long axis and the sectional images at an intersection point form a right angle with each other.

19. A device for reconstructing two-dimensional sectional images from a four-dimensional dynamic image data set of an object having an interior space surrounded by walls, the image data set being acquired by a medical imaging method and containing several three-dimensional data sets each representing a certain, different time frame within an object cycle, the device comprising:
  calculation means for
  (a) calculating a respective anatomical long axis through the object, such that the length and shape of the respective anatomical long axis is adapted to the length and shape of the object;
  (b) defining or allowing a user to define a series of intersection points distributed along the respective anatomical long axis;
  (c) defining a series of sectional planes, wherein each sectional plane intersects an intersection point on the respective anatomical long axis, wherein the respective anatomical long axis is not contained in said sectional planes, and wherein the sectional plane and a tangent of the anatomical long axis at the intersection point form approximately a right angle with each other;
  (d) calculating sectional images corresponding to the sectional planes from the four-dimensional image data set, and for automatically repeating steps (a) to (d) for each different three-dimensional data set within a single cycle of the object, thereby defining a respective anatomical long axis for each time frame, and a length and/or shape of the respective anatomical long axis for each time frame, such that a relative distribution of the intersection points along each respective anatomical long axis is kept constant automatically, over the different time frames, such that absolute distances between the intersection points vary over time in proportion with the length of the anatomical long axis, and display means for displaying the sectional images calculated by the calculation means.

20. The device according to claim 19, for reconstructing two-dimensional longitudinal images from a four-dimensional dynamic image data set of an object having an interior space surrounded by walls the image data set being acquired by a medical imaging method and containing several three-dimensional data sets each representing a certain time frame, the device further comprising:
  calculation means for
  (a) calculating the anatomical long axis through the object such that the length and/or shape of the anatomical long axis is adapted to a length and/or shape of the object;
  (b) defining a longitudinal plane parallel to the anatomical long axis;
  (c) calculating a longitudinal image corresponding to the longitudinal plane; and display means for displaying the longitudinal image.

21. The device according to claim 19, further comprising calculation means for automatically defining a respective anatomical long axis for each different three-dimensional data set.

* * * * *